United States Patent
Chatroux et al.

(10) Patent No.: US 9,669,696 B2
(45) Date of Patent: Jun. 6, 2017

(54) GASIFIER ENERGY PRODUCTION DEVICE (71) Applicant: COMMISSARIAT A L'ENERGIE ATOMIQUE ET AUX ENERGIES ALTERNATIVES, Paris (FR)

(72) Inventors: Daniel Chatroux, Teche (FR); Vincent Phlippoteau, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/108,222

(22) PCT Filed: Dec. 22, 2014

(86) PCT No.: PCT/EP2014/078973
§ 371 (c)(1),
(2) Date: Jun. 24, 2016

(87) PCT Pub. No.: WO2015/097142
PCT Pub. Date: Jul. 2, 2015

(65) Prior Publication Data
US 2016/0325612 A1    Nov. 10, 2016

(30) Foreign Application Priority Data
Dec. 26, 2013  (FR) ...................................... 13 63591

(51) Int. Cl.
*B60W 10/06*    (2006.01)
*B60K 6/24*     (2007.10)
(Continued)

(52) U.S. Cl.
CPC .................. *B60K 6/24* (2013.01); *B60K 6/44* (2013.01); *B60K 6/445* (2013.01); *B60K 6/46* (2013.01);
(Continued)

(58) Field of Classification Search
CPC . B60K 6/44; B60K 6/24; B60K 6/445; B60K 6/46; B60W 10/06; B60W 10/08; B60W 20/40; F01N 3/20
See application file for complete search history.

(56) References Cited

U.S. PATENT DOCUMENTS

2009/0090573 A1*  4/2009  Boone ..................... B60K 6/26
                                                    180/65.245

FOREIGN PATENT DOCUMENTS

CA    2 627 233 A1   10/2009
DE    100 13 080 A1   9/2001
(Continued)

OTHER PUBLICATIONS

International Search Report Issued Mar. 4, 2015 in PCT/EP14/078973 Filed Dec. 22, 2014.

*Primary Examiner* — John Walters
*Assistant Examiner* — James Triggs
(74) *Attorney, Agent, or Firm* — Oblon, McClelland, Maier & Neustadt, L.L.P.

(57) ABSTRACT

A gasifier energy production device including: a gasifier device including a fuel inlet, an air inlet, and a fuel gas outlet; a heat engine including an air inlet, a fuel gas inlet, and an exhaust gases outlet; a battery; an electrical current generator, the heat engine is coupled to at least the electrical current generator and the electrical generator is coupled to the battery; and a controller such that all fuel gas produced by the gasifier device once the gasifier device produces sufficient gas to make the heat engine operate and until the heat engine has stopped is injected into the engine such that energy required at an output from the energy production device is independent of the production of fuel gas.

23 Claims, 6 Drawing Sheets (51) Int. Cl.
  *B60K 6/445*  (2007.10)
  *B60K 6/46*   (2007.10)
  *B60K 6/48*   (2007.10)
  *B60W 10/08*  (2006.01)
  *B60W 20/40*  (2016.01)
  *B60K 6/44*   (2007.10)
  *F01N 3/20*   (2006.01)
  *F02B 63/04*  (2006.01)
  *F02D 41/10*  (2006.01)
  *F02M 31/18*  (2006.01)
  *F02M 35/10*  (2006.01)
  *F16H 48/06*  (2006.01)
  *F02B 43/08*  (2006.01)

(52) U.S. Cl.
  CPC ............... *B60K 6/48* (2013.01); *B60W 10/06* (2013.01); *B60W 10/08* (2013.01); *B60W 20/40* (2013.01); *F01N 3/20* (2013.01); *F02B 63/04* (2013.01); *F02D 41/107* (2013.01); *F02M 31/18* (2013.01); *F02M 35/10* (2013.01); *F16H 48/06* (2013.01); *B60Y 2200/92* (2013.01); *B60Y 2400/43* (2013.01); *F02B 43/08* (2013.01); *Y02T 10/6217* (2013.01); *Y02T 10/6221* (2013.01); *Y02T 10/6239* (2013.01); *Y02T 10/6286* (2013.01); *Y02T 10/6295* (2013.01); *Y10S 903/905* (2013.01)

(56) References Cited

FOREIGN PATENT DOCUMENTS

| | | |
|---|---|---|
| DE | 202 12 148 U1 | 1/2004 |
| EP | 1 426 586 A1 | 6/2004 |
| FR | 882 793 | 6/1943 |
| FR | 903 260 | 9/1945 |
| WO | 2008/068596 A2 | 6/2008 |

* cited by examiner

GASIFIER ENERGY PRODUCTION DEVICE

TECHNICAL DOMAIN AND STATE OF PRIOR ART

This invention relates to a gasifier energy production device and a gasifier drive system for a hybrid automobile vehicle.

The gasifier device was invented in the 1920s, it is a system that produces a fuel gas from a solid fuel such as wood chips. The fuel gas supplies a heat engine that generates mechanical energy that can be used for example to drive an axle of an automobile vehicle. The use of a gasifier device eliminates the need to use a fossil fuel as an energy source.

However, the gasifier device has some disadvantages.

It is slow to start, it usually takes between 10 min and 30 min before it can generate gas that can be used by the heat engine.

Another problem is that it is subject to unexpected stoppages, particularly due to a problem with the fuel supply.

Furthermore, gas generation is not easily controlled. If there is a fast increase in the power demand, the addition of a larger quantity of wood chips does not usually generate a quantity of gas until after the chips have warmed up. Therefore there is a long delay between the addition of fuel and the generation of gas.

If the mechanical energy demand is low, it is impossible to reduce the quantity of gas produced without stopping the gasifier device, and even in this case, it still produces gas due to residual heat. On the contrary, with a conventional heat engine supplied by a fossil fuel, the fuel supply valve or the fuel injection device is controlled.

As disclosed above, when the gasifier device is stopped, it continues to produce gas that will not be used, either these gases will be discharged into the environment directly, or they have to be burned and lost. The result is pollution and a waste of resources.

Therefore, it is difficult to use a gasifier device as a single reliable energy source for an application requiring fast power variations with time scales of the order of a second or a fraction of second, particularly for an automobile vehicle. For vehicle traction applications, gasifiers are considered to be an obsolete solution from a long gone past that disappeared after the Second World War to be replaced by gasoline and diesel powered vehicles.

Gasifiers devices are used for example in stationary electricity generating applications making use of a heat engine and a generator or an alternator. The disadvantages related to the gasifier start and stop times may be managed because there is no need to slave electricity generation to a fluctuating need in time, since other energy sources connected to the network are capable of satisfying demand variations.

Document FR903260 discloses a vehicle comprising an electric motor and a heat engine powered by a gasifier device. When the vehicle is started, the electric motor is used, as is the case when the vehicle is running on flat ground. Therefore the slow starting of the gasifier device is solved. The heat engine is used for "high load points", i.e. on steep slopes, combined with the electric motor.

But, the disadvantage related to management when the gasifier device is stopped is not solved. Gases produced after the gasifier device has stopped are not used.

PRESENTATION OF THE INVENTION

Consequently, one purpose of this invention is to provide a gasifier energy production device without the disadvantages mentioned above.

The purpose described above is achieved by a gasifier energy production device comprising a heat engine supplied by fuel gases produced by a gasifier device, a generator driven by the heat engine and at least one battery, the device being controlled such that all the fuel gas produced starting from a state in which the gasifier device is producing a steady supply of fuel gas and until the heat engine is stopped, is used to supply the heat engine and to generate mechanical energy. Furthermore, the battery supplies some of the energy shortage to satisfy the demand or absorbs some of the excess energy above the demand.

Advantageously, the gasifier device continues to produce fuel gas after it has been stopped, and nevertheless this gas continues to be converted into mechanical energy for example to charge the battery.

Due to the combination of a heat engine supplied by a gasifier and a generator, even if the energy demand is reduced, the fuel gas continuously produced by the gasifier is consumed by the heat engine and is converted into electricity to charge one or more batteries. Thus, there is no release of unburned fuel gas that would be a source of pollution and resources are not wasted.

In other words, gas production by the gasifier device is decoupled from the energy demand at the output from the energy production device. When fuel gas production is less than the demand, the battery or batteries supply the energy differential, and when gas production is higher than the demand, the electrical energy generated is stored in the battery(ies).

The energy production device is advantageously used to make a drive system for an automobile vehicle, the generator and the battery are then connected to an electric motor that is mechanically connected to an axle. Mechanical energy is converted into electricity by the generator to supply power to the electric motor and/or charge the battery and/or is used directly to drive at least one axle of the automobile vehicle.

The device is such that all fuel gas produced by the gasifier is converted into mechanical energy that is used either to generate electricity to supply power to an electric motor, or to drive at least one axle of the vehicle directly, starting from the moment at which production is sufficient to supply the heat engine and at least while the vehicle is running.

Starting takes place using the electric motor. This thus compensates for the slow starting of the gasifier device.

If the gasifier device stops unexpectedly, the heat engine stops, the battery or batteries then supply power to the electric motor and drive the axle(s) continuously, while waiting for the gasifier to restart.

Very advantageously, the efficiency of the heat engine is optimised by determining the composition of the exhaust gases and the heat engine is controlled by varying the air quantity entering the heat engine.

The reliability of the system can be improved by making the generator by combining an alternator with an ac rectifier device such as a diode bridge, or converter. If a converter is used, it will be used in energy absorption to perform the rectifier function, and advantageously it could be controlled in sinusoidal current absorption to minimise losses in the alternator.

The subject-matter of this invention is then a gasifier energy production device comprising:
- an output supplying mechanical energy and/or electrical energy;
- a gasifier device comprising a supply of fuel material, an air inlet and a fuel gas outlet;

a heat engine comprising an air inlet, a fuel gas inlet, and an exhaust gas outlet;
at least one electricity storage battery;
an electrical current generator;
connection means between an evacuation outlet of the fuel gas from the gasifier device and inlet of fuel gas to the heat engine;
the heat engine being coupled to at least the electrical current generator to supply mechanical energy to it;
the electricity generator being coupled to at least the battery;
control means such that the connection means between the gasifier device and the heat engine inject all the fuel gas produced by the gasifier device once the gasifier device has produced sufficient gas to make the heat engine operate and until the heat engine has stopped such that the energy required at the output from the energy production device is independent of the production of fuel gas, the differential between the energy demand and the energy obtained from the quantity of gas produced by the gasifier device being compensated by the battery that either outputs the missing energy, or absorbs the excess mechanical energy produced by the heat engine and converted by the generator.

Preferably, the generator is controlled so that it operates at the maximum power of the heat engine at all times t for the supply gas flow at the time or at the maximum electrical power.

The rotation speed of the heat engine is preferably controlled by the torque of the generator such that it operates at high torque and low rotation speed.

The gasifier energy production device may comprise a probe at the exhaust gases outlet to determine the composition of exhaust gases, an air inlet valve in the heat engine being controlled based on this composition.

The control means advantageously use an algorithm for tracking the operating point at maximum electrical power.

In one embodiment, the connection means comprise means of redirecting the fuel gas at the outlet from the gasifier device, such that during a starting phase before the gasifier device produces sufficient gas to supply the heat engine, the fuel gas is redirected and does not supply the heat engine According to another advantageous characteristic, the gasifier energy production device may comprise means of warming up the heat engine using the energy of the redirected fuel gas.

The gasifier energy production device may comprise a burner downstream from the redirection means, such that the redirected fuel gas is burned, a catalytic converter advantageously being provided downstream from the burner or forming the burner. The catalytic converter may be located at the heat engine exhaust gases outlet.

The gasifier energy production device may comprise a tank of fuel material and a means of supplying a fire place of the gasifier device from the tank, the supply means advantageously being a worm screw.

Another subject-matter of the invention is a drive system for an automobile vehicle comprising an electric motor and at least one gasifier energy production device according to the invention, in which the outlet from the energy production device is connected to an electric motor and the electric motor is mechanically connected to at least one axle of the vehicle.

In one example embodiment, the axle is driven by the electric motor alone.

In another example embodiment, the heat engine and the electric motor are mechanically connected to the same axle, preferably through an epicyclic gear.

In another example embodiment, the heat engine and the electric motor are mechanically connected to different axles.

The drive system may comprise an electrical machine forming the electric motor and the generator.

Advantageously, the drive system is such that when the vehicle has stopped running and the axle is stopped, the heat engine continues to operate so as to convert the fuel gas into electricity through the generator.

Another subject-matter of the is a hybrid automobile vehicle comprising two axles and at least one drive system according to the invention, one of the axles being driven by at least the electric motor.

Another purpose of this invention is an operating method for a gasifier energy production device according to the invention or the drive system according to the invention, comprising the following steps:

a) the battery supplies energy when the gasifier energy production device starts;

b) start up the gasifier device, the redirection means redirecting the fuel gas produced so that it does not enter the heat engine;

c) detect when a sufficient quantity of fuel gas is produced to run the heat engine;

d) connection means direct all fuel gas to the heat engine and the heat engine starts;

e) transform the generated mechanical energy into electrical energy through the generator;

d) stop the heat engine;

e) stop the gasifier device.

Preferably, in step e), the maximum electrical power is tracked by modifying the torque of the generator applied to the heat engine and measuring the new output electrical power.

The fuel gas can be used to warm up the heat engine between step b) and step c), either directly or by being burned.

The gasifier device may be started when the battery charge is below a given threshold.

Advantageously, when the energy demand is zero, the gasifier device is stopped and the heat engine continues to operate to transform the fuel gas that is still being produced.

BRIEF DESCRIPTION OF THE DRAWINGS

This invention will be better understood after reading the following description and the appended drawings on which.

DETAILED PRESENTATION OF PARTICULAR EMBODIMENTS

In the following description, the invention will be described in an application to a drive system for an automobile vehicle. But it will be understood that this invention applies to an energy production device that can be used in fields other than the field of automobiles, for example to make an electricity generating set or to drive an element other than an axle.

Figure 1:
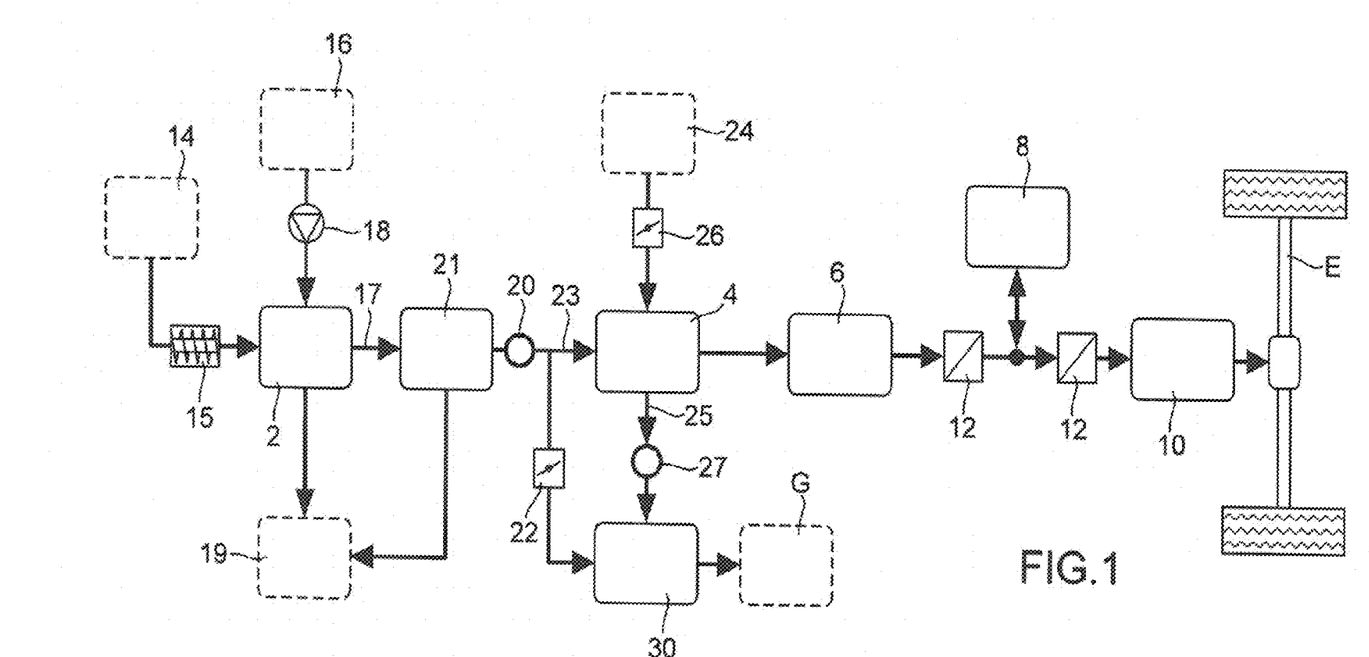
FIG. 1 is a block diagram of a hybrid drive system of an automobile vehicle according to one embodiment.

FIG. 1 shows a block diagram of a hybrid drive system of an automobile vehicle according to one embodiment. The drive system comprises a gasifier device 2, a heat engine 4, an electricity generator 6, at least one electrical battery 8 and an electric motor 10.

The gasifier device supplies the heat engine 4 with fuel gas 23, the heat engine 4 drives the generator 6 that charges the battery 8 or supplies power to the electric motor 10. The electric motor 10 is engaged with at least one axle E of the automobile vehicle so as to rotate it and to make the vehicle run.

Converters 12 are provided between the generator 6, the battery 8 and the electric motor 10.

A gasifier device is an equipment that produces fuel gas from solid and combustible materials such as wood chips, biomass residue or any other solid fuel, charcoal, coke or anthracite, that can be used to supply heat engines.

The principle of the gasifier is to provoke incomplete combustion for example of wood by controlling the air supply to the fire place, so as to produce fuel gases such as CO (carbon monoxide), H2 (hydrogen), and CH4 (methane).

The gasifier device comprises a fuel supply tank 14, a reaction chamber 2, an air inlet 16 into the fire place and an evacuation 17 of the fuel gas produced. The combustible material, for example wood chips, is advantageously supplied to the fire place using a worm screw 15, eliminating or at least reducing the risk of the occurrence of the arching phenomenon in the fuel that would interrupt the supply to the gasifier. A fan or a compressor 18 is advantageously provided to control the air flow through the air inlet 16 and its control will be described below.

One or more filters 21 are advantageously inserted between the outlet 17 of fuel gases from the gasifier and the inlet 23 to the heat engine 4 so as to collect ash. The gasifier 2 also includes evacuation of ash to an ash pit 19 to collect ash produced in the fire place by combustion of the fuel. The filter(s) is (are) advantageously connected to the ash pit 19 to collect retained ash. This or these filter(s) 21 is (are) preferably tangential and vertical so that dust and ash will drop. "Cyclone" filters can provide very efficient separation of dust and ash.

Preferably a probe 20 is provided at the outlet from the gasifier device 2 to determine the composition of gas at the outlet, for example downstream from the filter(s) of the gasifier device.

Redirection means 22 are also provided between the gasifier device 2 and the heat engine 4 to redirect gases produced by the gasifier particularly in the starting phase so that they do not supply the heat engine 4. These means 22 will be disclosed below.

The heat engine 4 comprises at least one combustion chamber, an air inlet 24 and a controllable valve 26 to control the air flow through the inlet 24. The control of the controllable valve 26 will be disclosed below. The heat engine 4 also comprises a fuel gas supply 23 and an exhaust 25 for evacuation of combustion gas. A catalytic converter is advantageously provided at the exhaust 25. A lambda type probe 27 is advantageously located at the exhaust 25 to determine the composition of exhaust gases. A burner 30 is preferably provided at the outlet from the redirection means 22. Advantageously a catalytic converter is provided at the outlet from the burner 30, preferably the same as that used for the heat engine.

We will now describe operation of the drive system:

When the vehicle starts, the gasifier device 2 and the heat engine 4 are stopped, the battery 8 supplies power to the electric motor 10 and starts the vehicle. The electric motor 4 is controlled in torque, according to the demand from the driver, for example on the accelerator pedal, at the time of starting. Since the gasifier device is not involved in the start phase, there is no waiting phase to drive the axle E.

It is advantageous that the gasifier device 2 starts automatically, for example when the charge state of the battery (ies) 8 drops below a given threshold. Alternately, the driver can control starting of the gasifier device. At this moment, the heat engine 4 is still off. Alternately, the gasifier device 2 could be started immediately when the vehicle starts, so that it can replace the battery(ies) 8 as soon as possible.

The gasifier device is advantageously started electrically. The gasifier device 2 is supplied with fuel. Preferably, the fuel is in the form of small pieces less than one cm thick. Advantageously, it will be possible to add water fostering the production of hydrogen, to enable steam reforming, and/or a liquid fuel such as oil. Advantageously, he fuel could be heated, for example the chips could be heated before they are admitted into the fire place. This heating may for example be achieved by heating the feed worm screw 15 by induction, or by making a heat exchange between the catalytic converter and the fuel inlet pipe.

When the air inlet 16 is open, air is supplied to the fire place of the gasifier device 2.

Advantageously, the gasifier device may be supplied with air through the air inlet 16, using a compressor or a fan 18, which optimises the quality of the outlet gas using the probe 20 at the outlet from the gasifier device 2.

During this starting phase of the gasifier, that can last for 10 to 30 minutes, the gasifier device 2 does not produce sufficient fuel gas to supply the heat engine 4. The heat engine 4 has not yet started and the redirection means 22 are open such that the fuel gas does not supply the heat engine 4.

When water is added for steam reforming, the gasifier can operate endothermically. In the absence of water, generation of the fuel gas creates heat that can advantageously be recovered, for example to warm up the heat engine 4 through its cooling circuit.

This warming up may be done using hot fumes from fuel gases produced by the gasifier device and/or by the combustion of fuel gases produced by the gasifier device. In the latter case, the burner 30 burns the fuel gases. Also, advantageously, the catalytic converter provided downstream from the burner limits releases of polluting gases into the environment. This catalytic converter is preferably the converter located at the outlet from the exhaust of the heat engine. The burner function may be performed by the catalytic converter at the outlet from the heat engine. The catalytic converter may be warmed up electrically to accelerate its temperature rise and minimise its starting time, and pollutants are not completely eliminated during this phase. Alternately, the cooling fluid of the heat engine can circulate in the hot parts of the gasifier device, however taking care not to reduce the temperature rise of the gasifier.

Warming up the heat engine 4 will allow it to operate at a sufficiently high temperature immediately when it is started. This avoids engine cold starts that have an impact for example on its life and maintenance needs. In installing a burner 30 to burn gases produced by the gasifier in the starting phase and a catalytic converter on the downstream side, these gases will not be released into the environment. They are also reused to warm up the heat engine. The released gases denoted G are conventional exhaust gases.

Heat from the catalytic converter may also be used for warming up the gasifier and/or the heat engine.

Furthermore, by using the catalyser of the heat engine for burned gases, the catalyser will be warm when the heat engine starts to produce exhaust gases, therefore, the catalytic converter will be efficient immediately and pollution will be reduced.

The user continues to operate his vehicle according to his needs during this phase, power being supplied by the battery (ies) 8.

When the gasifier device is warm and generates a sufficiently large quantity of fuel gas to supply the heat engine 4, the redirection means 22 are closed and the heat engine 4 is supplied with fuel gas, it is then started for example by the electrical machine forming the generator 6 that in this case is used as a motor. For example, if the generator consists of an alternator associated with a dc-ac converter, the engine may be started by controlling the converter to control the electrical machine in drive (motor) during this start phase, and then as an alternator after starting. The moment at which the gasifier produces sufficient gas can be measured using a probe 20, for example a catalytic probe, to measure the flow and percentage of fuel gas in the mix.

Fuel gas cooling and/or drying means may be provided between the gasifier device and the heat engine.

The heat engine 4 is supplied with fuel gas output from the gasifier device mixed with external air by controlling the inlet valve 26 so as to be at or close to stoichiometry. This mix may be regulated, preferably by making use of information from the lambda probe 25 at the outlet from the heat engine 4, with a regulation loop managing the richness of the mix based on this information.

The drive system is operating normally, the heat engine 4 drives the generator 6 that supplies power to the electric motor 10 that drives the axle E.

The batteries 8 are charged by the generator 6, for example during phases during which the generator 6 produces more than the demand. It would be possible to charge the battery(ies) 8 and to supply the electric motor 10 simultaneously.

If the gasifier device is stopped unexpectedly, the battery or batteries 8 provide service continuity. They supply power to the electric motor 10 until the gasifier device 2 is once again in a state ready to produce a sufficiently large quantity of fuel gas. It should be noted that in this case, the gasifier device restarts more quickly than when it initially started.

However, it should be noted that such unexpected stoppages are less frequent with the invention. According to the invention, control of the gasifier device 2 and control of the electric motor 10 are independent, due to the battery 8. The gasifier device 2 can then be prevented from stopping by monitoring some gasifier parameters, for example temperature measurements at various locations, etc. This is done by acting on the air supply 16 through the compressor 18. Control of the heat engine 4 remains unchanged during this time, and is advantageously done "at maximum power" as will be explained later.

Therefore, demand from the electric motor 10 does not affect operation of the gasifier.

If the power to be absorbed by the heat engine 4 is too low and the batteries 8 are fully charged, it is also possible to stop the engine and release fuel gases by opening redirection means 22, and the fuel gases will then be burned. This operating mode with energy loss is avoided by stopping the gasifier early before the batteries 8 are fully charged, for example when a predefined threshold is reached. The electric motor 10 is then powered only through the battery. The gasifier may for example be stopped by cutting off the fuel supply. The gasifier device continues to produce gas for a certain time even after it has been stopped, control of the heat engine 4 remains unchanged until this power is too low and then the engine is also stopped.

The gasifier device 2 is stopped when the vehicle is stopped, but it continues to produce gas. The heat engine 4 continues to operate to consume the gas produced, and the generator 6 continues to charge the battery 8, even when the vehicle has finished its mission. Thus, all gas produced by the gasifier device is converted into reusable energy.

When the vehicle is stopped and the gasifier no longer produces gas and the batteries need to be charged, they can be recharged on the electricity network like any electric vehicle.

We will now describe a particular advantageous method of controlling the heat engine 4.

Advantageously, the heat engine 4 is controlled at "maximum power" to produce maximum power by instantaneously consuming the fuel gas produced by the gasifier device 2. The rotation speed of the heat engine 4 is managed by controlling the torque of the generator 6, and by controlling the air inlet 24 by valve 26.

This decouples gas production and driver demand. The differential between this production and this demand is absorbed or supplied by the battery.

Fuel gas produced by the gasifier device is transformed into electricity with optimum efficiency at all times.

Figure 2:
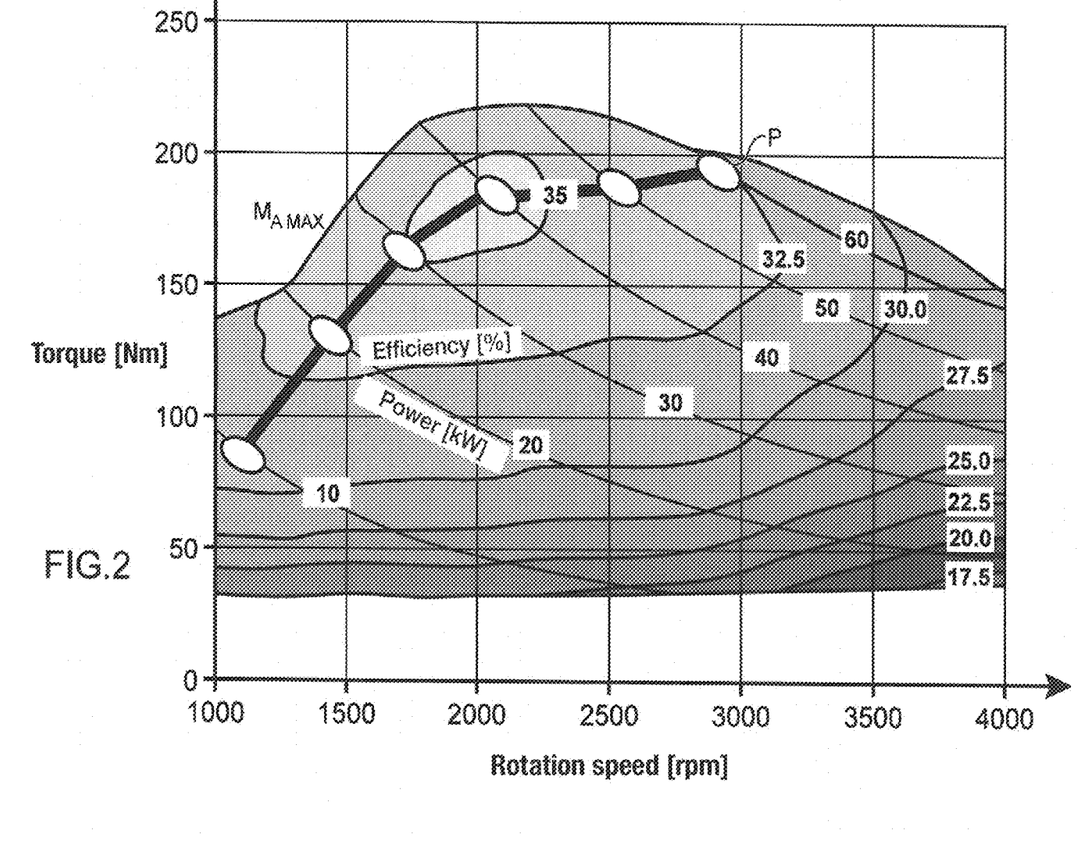
FIG. 2 is a torque $M_A$ (Nm)-rotation speed (rpm)-power (kW)-efficiency C (%) diagram for a heat engine.

FIG. 2 shows a torque (Nm)-rotation speed (rpm)-power (kW)-efficiency (%) diagram for a heat engine.

On this diagram, the hyperbolas shown in dashed lines are isopower lines varying from 10 kW to 60 kW, and the solid lines delimit efficiency zones.

Curve P corresponds to optimum efficiency operating points that we attempt to reach with our invention.

Preferably, we would like to work in the <<maximum torque>> zone because, as shown in FIG. 2, for a given power, it is preferable to operate at high torque, advantageously at about at least 50% of the maximum torque for the given rotation speed and even more advantageously at about 75% of the maximum torque for a given speed, and low speed. The use of a generator can control the speed of the heat engine and therefore continuously change the point on the curve P. For example, the torque of the generator that may be a synchronous or asynchronous machine can be controlled through its converter, by adjusting excitation in the case of a dc generator and/or by control of the excitation of a synchronous machine with separate excitation.

It should be noted that the efficiency of the generator is very high and only slightly depends on the operating point relative to the operating point of a heat engine, consequently the efficiency of the heat engine is almost equivalent to the efficiency of the heat engine and generator assembly. Thus, the optimum operating line determined above in FIG. 2 can be reached by tracking the maximum electrical power.

Preferably, the heat engine is controlled such that the fuel gas is consumed with better energy efficiency and such that combustion is as complete as possible, to reduce the release of unburned products and thus respect antipollution standards imposed on automobile vehicles. Air inlet into the combustion chamber of the heat engine and the electricity generator torque are controlled to achieve this.

The heat engine can very advantageously be controlled using an MPPT (maximum power point tracking) type algorithm, this algorithm being implemented to control the torque of the generator. The electrical power is maximum when the mechanical power is maximum, i.e. when all fuel gas is consumed, and the maximum efficiency point of the heat engine is reached.

Maximum power tracking algorithms have been developed more particularly in the field of photovoltaic systems to extract maximum power at all times, by tracking sunshine variations.

Very advantageously, efficiency can be further optimised using information given by the lambda probe installed at the outlet from the exhaust gases from the heat engine. Efficiency can be optimised by determining the composition of exhaust gases, and varying control of the heat engine and therefore control of the electricity generator, and controlling the valve 26 to control the air quantity entering the heat engine.

For example, when there is an excess of unburned materials, the air quantity in the heat engine is increased so as to consume all fuel gas produced by the gasifier device. Excess power is then absorbed by the battery(ies). This operation is unlike the state of the art for the control of gasoline engines in conventional vehicles: when there is an excess of unburned materials, controllers of gasoline engines reduce the injected fuel quantity, and unburned fuel remains in the tank and the generated power reduces.

Figure 6:
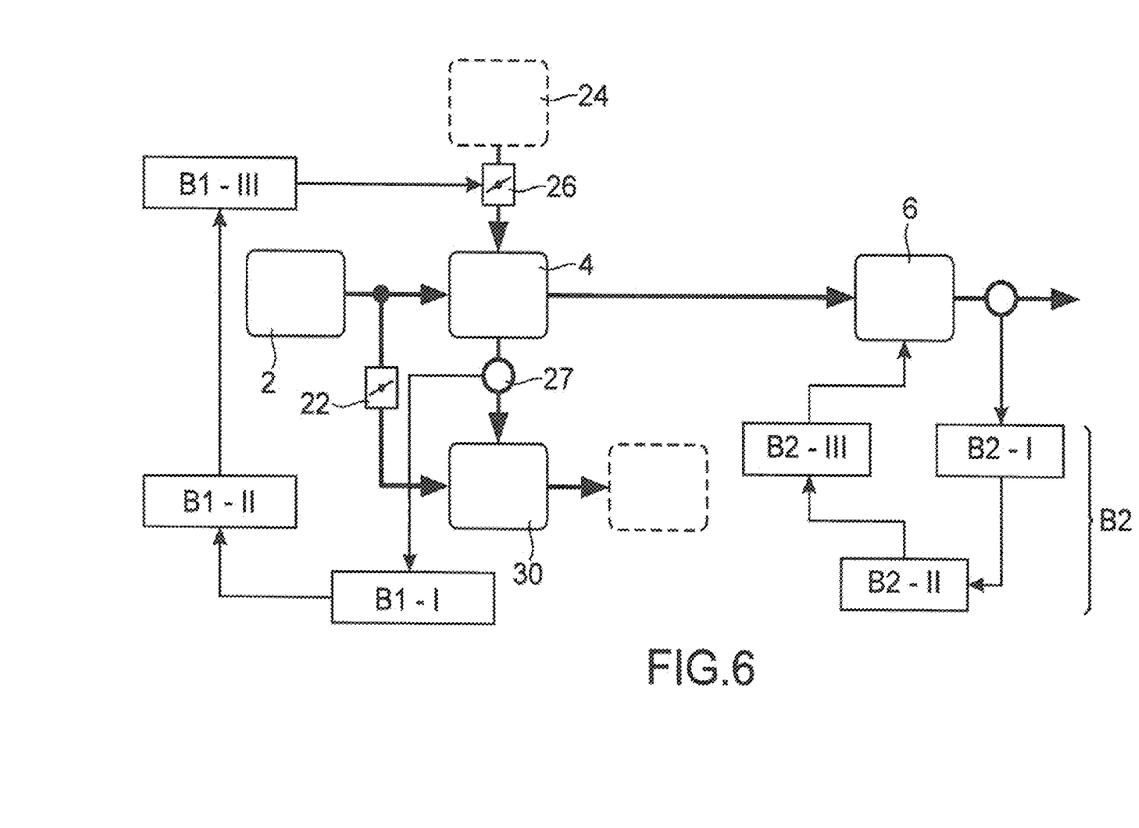
FIG. 6 is a diagram of the system in FIG. 1 in which regulation loops have been added.

FIG. 6 diagrammatically shows examples of regulation loops B1 and B2 of the heat engine. These regulation loops are implemented by a computer.

Firstly, the engine control means include a loop B1 that uses the lambda probe measurement of burned gases from the heat engine and control the air inlet valve 26 into the combustion chamber of the heat engine 4.

Loop B1 comprises the following steps:

B1-I—determine the composition of gases at the outlet from the combustion chamber of the heat engine; for example, the quantity of oxygen is measured and optimum combustion is tracked;

B1-II—track the best combustion,

B1-III—based on this tracking, the inlet air quantity is modified by controlling the air inlet valve 26. If there is a shortage of oxygen, the air-fuel gas mix is too rich in fuel and the air quantity is increased, and conversely if there is an excess of oxygen, the air-fuel gas mix is too lean in fuel and the oxygen quantity is reduced.

Loop B2 controls the generator 6.

Preferably, the generator torque is controlled such that:

the speed of the heat engine is higher than the engine idling speed, typically 600-1000 rpm, to prevent the engine from stalling.

The electrical power is maximum.

Loop B2 includes the following steps:

B2-I—measure the electrical power at the outlet from the generator,

B2-II—tracking the maximum electrical power using an MPPT type algorithm;

B2-11I—control the generator by modifying its rotation speed that acts on the rotation speed of the heat engine, so that curve P can be followed. For example, the generator torque and therefore the torque of the heat engine can be varied slightly about a reference torque, at each instant. If the electrical power produced is higher, this new torque value will be assigned to the reference.

Figure 3:
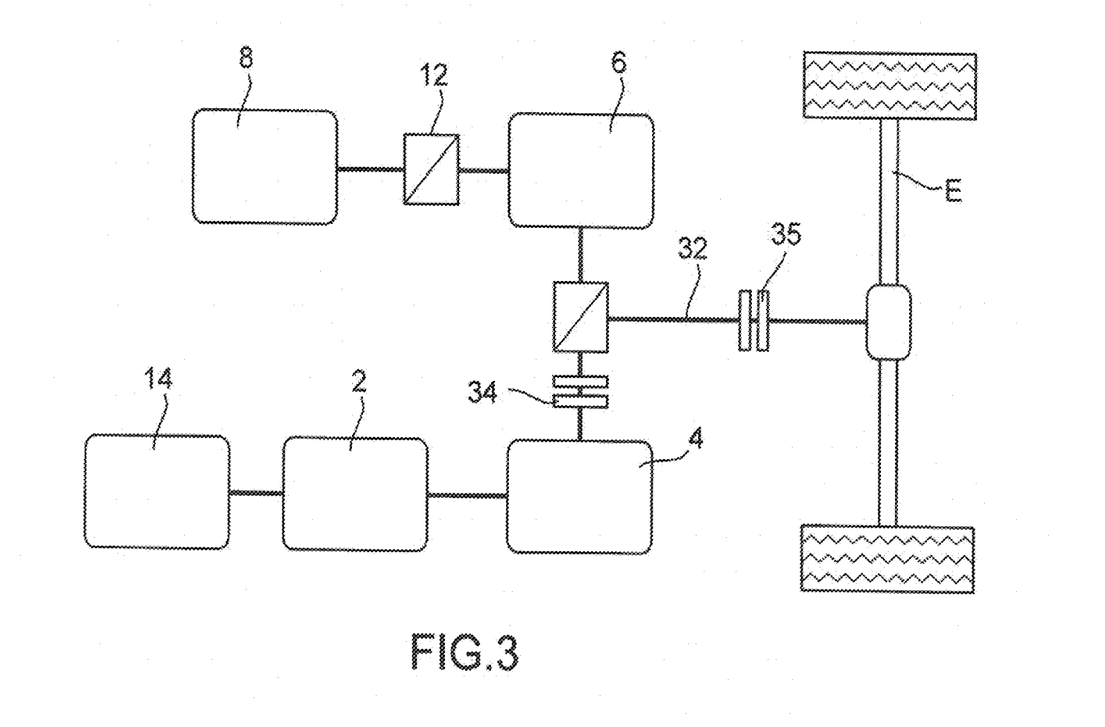
FIGS. 3 to 5 are block diagrams of other embodiments.

FIG. 3 shows another embodiment of a drive system according to the invention in which the heat engine can drive the axle directly.

In this embodiment, the heat engine 4 and the electric motor 10 are coupled to the axle E in parallel, and apply the output torque to the same shaft 32. This embodiment is frequently called <<parallel hybrid>> in hybrid gasoline/electric vehicles.

The electric motor 10 can operate as a generator to convert excess mechanical energy generated by the heat engine 4.

A clutch 34 is installed between the output shaft from the heat engine 4 and the shaft 32. This clutch is used to disconnect the heat engine when the vehicle is stopped. A gearbox is also provided to adapt the rotation speed of the heat engine and the shaft 32. The electric motor always rotates at a speed proportional to the speed of the shaft 32. A double clutch gearbox device (on the input and output sides of the gearbox) can also be used.

Very advantageously, another clutch 35 is installed in the shaft 32 to isolate the heat engine 4 and the electric motor 10 from the axle E and to make the electric motor 6 act as a generator and recover energy from fuel gases when the vehicle is stopped.

Figure 4:
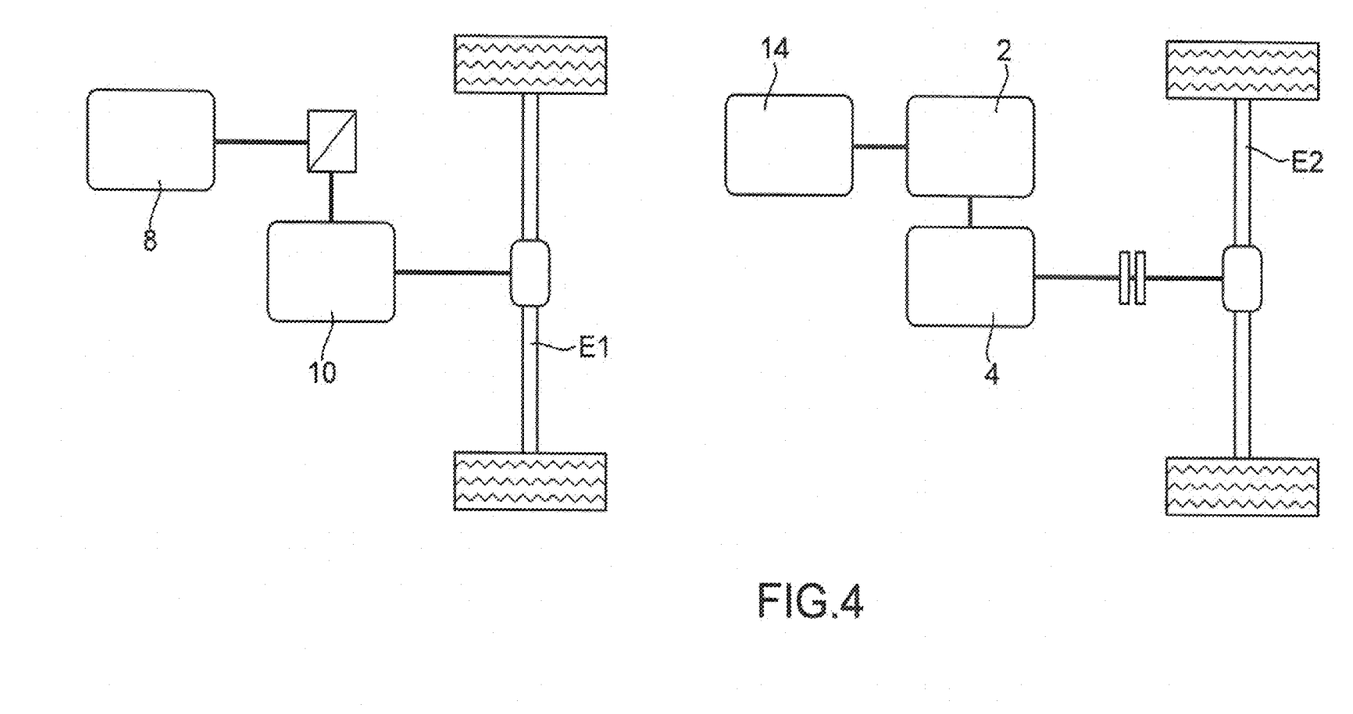

FIG. 4 shows another embodiment in which the electric motor drives the axle E1 and the heat engine drives the axle E2.

In this embodiment, the electric motor 10 will also operate as an electricity generator, the excess energy produced by the heat engine 4 is transmitted to the generator through the wheel and the two axles E1, E2.

Figure 5:
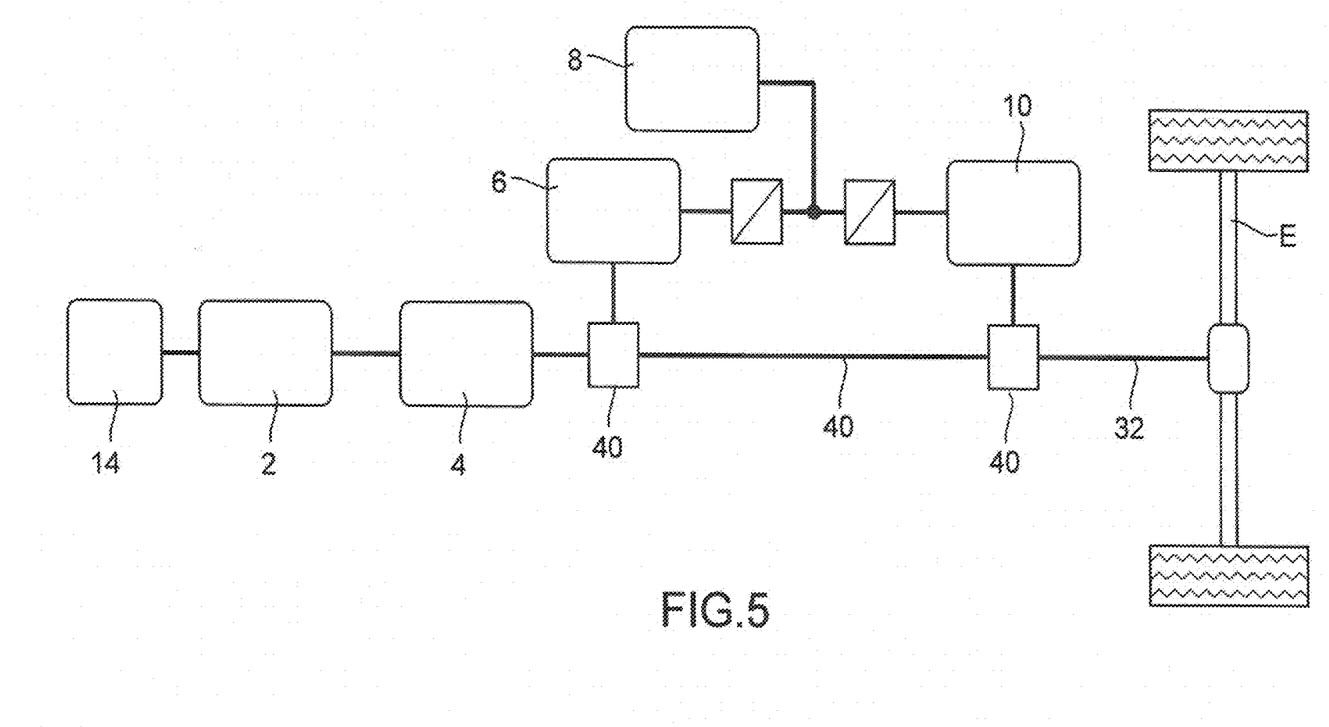

FIG. 5 shows another embodiment of the drive system that is different from that in FIG. 1 in that an epicyclic gear 40 connects the shaft of the heat engine 4 connected for example to the planet carrier, the shaft of the electricity generator 6 connected for example to the sun gear, and the shaft of the wheels 32 common with the shaft of the electric motor 10 connected for example to the ring gear. It will be understood that the shaft of the heat engine, the shaft of the electricity generator and the shaft of the wheels can each be connected to elements of the epicyclic gear.

It is thus possible to transmit some of the mechanical power from the heat engine 4 directly to the wheels, which reduces losses in the generator, converters and the electric motor. Operation is exactly the same as in the embodiment in FIG. 1.

The drive system is particularly applicable to vehicles such as agricultural machinery, for example a tractor. Fuel is often available on site and the farmer is both producer and consumer when he produces usable fuel (residue from trimming production trees, nutshells, etc.).

It is also applicable to worksite machinery such as backhoes.

This invention can also be applied to tourism vehicles.

The drive system can be used to drive a device other than an axle of an automobile vehicle; for example, it could be a transportable machine tool, worksite machinery, a tractor or other farm machinery. In the range of worksite and farm machinery, the invention makes it possible to run on battery energy for short term isolated operations, and the gasifier system can be started up for longer operations. The battery can also be recharged from the power outlet during storage phases.

This invention can also be used for manufacturing transportable electricity generating sets with batteries, and in this case an electric motor is not required since electrical energy is used at the output from the generator/or batteries.

Electricity generating sets made in this way do not have problems of slow starting, power limitation, unexpected stoppage, etc. The invention can overcome the low efficiencies of the electricity generating sets at low loads. Unlike conventional electricity generating sets in which rotation at low loads is maintained with prohibitive losses in comparison with energy supplied, the invention is capable of supplying electrical energy with a loss of a few percent when the battery is used to supply energy and the heat engine is stopped, and the gasifier system and the heat engine can then be started up, and then operate at a maximum efficiency to recharge the battery. When the required battery charge has been reached, the fuel supply is cut off, the gasifier system uses supplied residual gas and then stops. The battery then supplies continuous energy. The cycle thus described minimises losses of efficiency. Advantageously, the gasifier and the heat engine can be kept warm, ready for example to restart the next cycle after the battery has been discharged below a chosen threshold.

The invention claimed is:

1. A gasifier energy production device comprising:
    an output supplying mechanical energy and/or electrical energy;
    a gasifier device comprising a supply of fuel material, an air inlet, and a fuel gas outlet;
    a heat engine comprising an air inlet, a fuel gas inlet, and an exhaust gas outlet;
    at least one electricity storage battery;
    an electricity generator;
    at least one connection between an evacuation outlet of fuel gas from the gasifier device and inlet of the fuel gas to the heat engine;
    the heat engine being coupled to at least the electricity generator to supply mechanical energy to the electricity generator;
    the electricity generator being coupled to at least the battery;
    a controller such that the at least one connection injects all fuel gas produced by the gasifier device once the gasifier device has produced sufficient gas to make the heat engine operate and until the heat engine has stopped such that energy required at an output from the energy production device is independent of the production of fuel gas, a differential between energy demand and energy obtained from a quantity of gas produced by the gasifier device being compensated by the battery that either outputs missing energy, or absorbs excess mechanical energy produced by the heat engine and converted by the electricity generator.

2. A gasifier energy production device according to claim 1, wherein the electricity generator is controlled to operate at maximum power of the heat engine at all times for supply gas flow at a time or at maximum electrical power.

3. A gasifier energy production device according to claim 2, wherein rotation speed of the heat engine is controlled by torque of the electricity generator such that it operates at high torque and low rotation speed.

4. A gasifier energy production device according to claim 1, further comprising a probe at the exhaust gases outlet to determine a composition of exhaust gases, an air inlet valve in the heat engine being controlled based on the composition.

5. A gasifier energy production device according to claim 1, wherein the controller uses an algorithm for tracking an operating point at maximum electrical power.

6. A gasifier energy production device according to claim 1, wherein the at least one connection comprises a redirections device for redirecting the fuel gas at the outlet from the gasifier device, such that during a starting phase, the fuel gas is redirected and does not supply the heat engine until the gasifier device produces sufficient gas to supply the heat engine.

7. A gasifier energy production device according to claim 6, further comprising means for warming up the heat engine using energy of the redirected fuel gas.

8. A gasifier energy production device according to claim 6, further comprising a burner downstream from the redirection device, such that the redirected fuel gas is burned, a catalytic converter being provided downstream from the burner or forming the burner.

9. A gasifier energy production device according to claim 8, wherein the catalytic converter is provided at the exhaust gases outlet from the heat engine.

10. A gasifier energy production device according to claim 4, further comprising a tank of fuel material and a supplier for supplying a fire place of the gasifier device from the tank, the supplier being a worm screw.

11. A drive system for automobile vehicle comprising an electric motor and at least one gasifier energy production device according to claim 4, wherein the outlet from the energy production device is connected to an electric motor and the electric motor is mechanically connected to at least one axle of the vehicle.

12. A drive system according to claim 11, wherein the axle is driven by the electric motor alone.

13. A drive system according to claim 11, wherein the heat engine and the electric motor are mechanically connected to a same axle, through an epicyclic gear.

14. A drive system according to claim 11, wherein the heat engine and the electric motor are mechanically connected to different axles.

15. A drive system according to claim 13, further comprising an electrical machine forming the electric motor and the electricity generator.

16. A drive system according to claim 12, wherein when the vehicle has stopped running and the axle is stopped, the heat engine continues to operate to convert the fuel gas into electricity through the electricity generator.

17. A hybrid automobile vehicle comprising two axles and at least one drive system according to claim 11, one of the axles being driven by at least the electric motor.

18. An operating method for a gasifier energy production device according to claim 4, comprising:
    a) the battery supplying energy when the gasifier energy production device starts;
    b) starting the gasifier device, a redirection device redirecting the fuel gas produced so that the fuel gas does not enter the heat engine;
    c) detecting when a sufficient quantity of fuel gas is produced to run the heat engine;
    d) directing all fuel gas to the heat engine and starting the heat engine;
    e) transforming the generated mechanical energy into electrical energy through the generator;
    d) stopping the gasifier device;
    e) stopping the heat engine.

19. An operating method according to claim 18, wherein, in e), maximum electrical power is tracked by modifying torque of the electricity generator applied to the heat engine and measuring a new output electrical power.

20. An operating method according to claim 18, wherein between b) and c), the fuel gas is used to warm up the heat engine either directly or by being burned.

21. An operating method according to claim 18, wherein the gasifier device is started when the battery charge is below a given threshold.

22. An operating method according to claim 18, wherein when the energy demand is zero, the gasifier device is stopped and the heat engine continues to operate to transform the fuel gas that is still being produced.

23. An operating method for the drive system according to claim 11, comprising:

a) the battery supplying energy when the gasifier energy production device starts;
b) starting the gasifier device, a redirection device redirecting the fuel gas produced so that the fuel gas does not enter the heat engine;
c) detecting when a sufficient quantity of fuel gas is produced to run the heat engine;
d) directing all fuel gas to the heat engine and starting the heat engine;
e) transforming the generated mechanical energy into electrical energy through the generator;
d) stopping the gasifier device;
e) stopping the heat engine.

\* \* \* \* \*